US010771360B1

(12) United States Patent
Hutz et al.

(10) Patent No.: US 10,771,360 B1
(45) Date of Patent: *Sep. 8, 2020

(54) ENDPOINT DATA COLLECTION IN BATTERY AND DATA CONSTRAINED ENVIRONMENTS

(71) Applicant: Alarm.com Incorporated, Tysons, VA (US)

(72) Inventors: David James Hutz, Herndon, VA (US); Kyle Rankin Johnson, Arlington, VA (US); Caspar John Anderegg, McLean, VA (US)

(73) Assignee: Alarm.com Incorporated, Tysons, VA (US)

( * ) Notice: Subject to any disclaimer, the term of this patent is extended or adjusted under 35 U.S.C. 154(b) by 32 days.

This patent is subject to a terminal disclaimer.

(21) Appl. No.: 16/180,642

(22) Filed: Nov. 5, 2018

Related U.S. Application Data

(63) Continuation of application No. 15/167,627, filed on May 27, 2016, now Pat. No. 10,122,600.

(60) Provisional application No. 62/168,252, filed on May 29, 2015.

(51) Int. Cl.
H04L 29/08 (2006.01)
H04L 12/26 (2006.01)
G06F 11/34 (2006.01)
H04L 29/06 (2006.01)

(52) U.S. Cl.
CPC .......... *H04L 43/06* (2013.01); *G06F 11/3476* (2013.01); *H04L 43/045* (2013.01); *H04L 67/12* (2013.01); *H04L 69/04* (2013.01); *G06F 2201/86* (2013.01)

(58) Field of Classification Search
CPC ......... G08B 31/00; H04L 67/12; H04L 69/04; H04L 12/2803; H04W 28/06; H04W 4/80; G06Q 10/063; G06F 11/3476; G06F 2201/86
See application file for complete search history.

(56) References Cited

U.S. PATENT DOCUMENTS

2006/0146853 A1 7/2006 Paila
2010/0289643 A1 11/2010 Trundle
2013/0132000 A1 5/2013 Tamaki
2016/0311650 A1 10/2016 Hautakorpi

*Primary Examiner* — Chirag R Patel
(74) *Attorney, Agent, or Firm* — Fish & Richardson P.C.

(57) ABSTRACT

A method includes receiving, by a monitoring control unit of a property, multiple sensor reports from sensors within the property, wherein each sensor report describes sensor data generated by a respective sensor monitoring the property, determining, by the monitoring control unit, that a reporting criteria is satisfied, aggregating, by the monitoring control unit, the multiple sensor reports into an aggregated sensor report message, and in response to determining that the reporting criteria is satisfied, providing the aggregated sensor report to a monitoring server.

20 Claims, 4 Drawing Sheets

ENDPOINT DATA COLLECTION IN BATTERY AND DATA CONSTRAINED ENVIRONMENTS

CROSS-REFERENCE TO RELATED APPLICATION

This application is a continuation (and claims the benefit of priority under 35 USC 120) of U.S. application Ser. No. 15/167,627, filed May 27, 2016, now allowed, which claims the benefit of U.S. Provisional Application No. 62/168,252, filed May 29, 2015, and titled "Endpoint Data Collection in Battery and Data Constrained Environments." Both of these prior applications are incorporated by reference in their entirety.

TECHNICAL FIELD

This disclosure relates to monitoring technology and, for example, endpoint data collection.

BACKGROUND

Many people equip homes and businesses with monitoring systems to monitor their homes and businesses. Monitoring systems may include control panels that a person may use to control operation of the monitoring system and endpoints that may sense characteristics of an environment of the home or business. The control panel may collect data from the endpoints and send the data to a remote server to provide alerts or information to users.

SUMMARY

Techniques are described for monitoring technology. For example, techniques are described for endpoint data collection.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings, and from the claims.

DETAILED DESCRIPTION

Techniques are described for endpoint data collection. For instance, a monitoring system may collect data from thermostats. Other examples of endpoints include, for example, a contact sensor, a motion sensor, a glass break sensor, a temperature sensor, a water sensor, a rain sensor, a wind sensor, a light sensor, a smoke detector, a carbon monoxide detector, an air quality sensor, a health monitoring sensor, or other sensors. A monitoring system may collect data from endpoints in a battery or data constrained environment. For example, thermostats may be battery powered and may have limited power available before a battery of a thermostat must be replaced. In another example, bandwidth available for collecting data may be limited or expensive or data transmission may incur a large fixed overhead per message. Accordingly, the monitoring system may collect data from endpoints in a battery and data constrained environment based on using endpoints that push reports including sensor data to a control panel, which may reduce power use for the endpoints, where the control panel queues the reports and transmits a single message to a server including sensor data from the multiple queued reports, which may reduce bandwidth use by the control panel.

Figure 1:
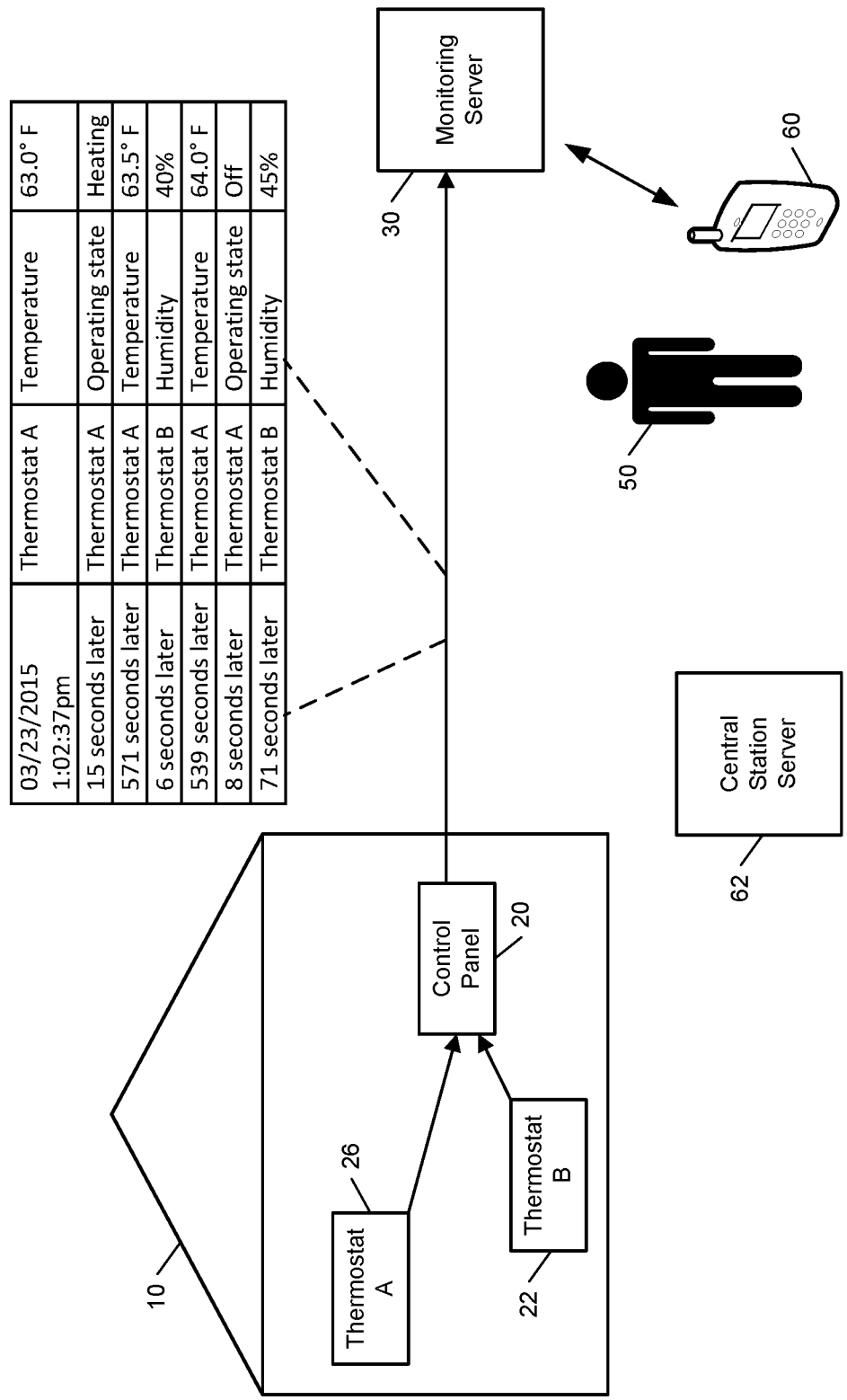
FIG. 1 illustrates an example of endpoint data collection.

FIG. 1 illustrates an example of endpoint data collection. As shown in FIG. 1, a property 10 (e.g., a home) of a user is monitored by an in-home monitoring system (e.g., in-home security system) that includes components that are fixed within the property 10. The in-home monitoring system includes a control panel 20, thermostat A 26, and thermostat B 22. The thermostats may be configured to sense temperature and/or humidity. Other systems may include other endpoints.

The control panel 20 communicates over a wireless connection with each of the thermostats A 26 and B 22. The control panel 20 also communicates over a long-range wired or wireless connection with a monitoring server 30. The monitoring server 30 is located remote from the property 10 and manages the in-home monitoring system at the property 10, as well as other (and, perhaps, many more) in-home monitoring systems located at different properties that are owned by different users. The monitoring server 30 receives, from the control panel 20, sensor data descriptive of events detected by the sensors included in the in-home monitoring system of the property 10.

In the example shown in FIG. 1, the thermostats A 26 and thermostat B 22 are configured to provide reports to the control panel 20. The thermostat A 26 and thermostat B 22 may be located in separate areas of the property so that they sense different temperatures or humidity. For example, thermostat A 26 may be located in a kitchen and thermostat B 22 may be located in a bedroom.

In some implementations, for endpoint devices, pushing reports may conserve five times as much power as providing reports in response to poll requests for reports. Accordingly, the thermostats 26, 22 may be configured to push reports to the control panel. In particular, the thermostats 26, 22 may be configured to push reports to the control panel 20 when a change in a state of the thermostat 26, 22 satisfies a report criterion. For example, the thermostats 26, 22 may be configured to push a report to the control panel when a temperature changes by 0.5 degree, 1 degree, or another amount, or a humidity changes by 3%, 5%, or another amount, or a pre-determined amount of time has elapsed since the last report (e.g., one hour or thirty minutes). The reports from the thermostats 26, 22 may indicate the endpoint device sending the report, an event that triggered the report, and a specific value. For example, a report may indicate that Thermostat A sensed a temperature of 63 degrees.

The control panel 20 may receive the reports from the thermostats 26, 22 and queue the reports for sending to the monitoring server 30 in a single message. For example, the control panel 20 may receive seven reports and transmit a single message including information from all seven reports to the monitoring server 30. In some implementations, each message from the control panel 20 to the monitoring server 30 may include an overhead that is independent of the amount of sensor data included in the message. Accordingly, the control panel 20 may reduce an amount of bandwidth used for providing sensor data to the monitoring server 30 based on including sensor data from multiple reports in a single message instead of sending a separate message for each report received.

The control panel 20 may combine reports into a single message by queuing reports until a predetermined number of reports have been queued, a predetermined size of a queue exceeds a buffer, a predetermined length of time has passed since the last message was sent, a request from the monitoring server 30 was received, or some other reporting criteria is satisfied. In some implementations, the control panel 20 may send the message once any of the above criteria is satisfied. For example, the control panel 20 may send a message including sensor data from every queued report as soon as one of the previous criteria is satisfied. In some other implementations, the control panel 20 may include sensor data from queued reports in messages that have high priority. For example, door opening events may have high priority so any time the control panel 20 receives a report from a sensor that indicates a door is opened, the control panel 20 may transmit a message indicating that door is opened, and additionally include sensor data for any other report that is already queued.

The control panel 20 may queue reports based on analyzing reports and not queuing data from the reports that is not necessary. For example, the control panel 20 may receive four reports from the same thermostat where each report indicates a long unique identifier for the thermostat, and instead include in the queue an indication that a short unique identifier stands for the long unique identifier, and subsequently use the short unique identifier.

In queuing reports, the control panel 20 may also include timestamps for each report. For example, the timestamps may indicate when the report was received by the control panel 20 or when the report was generated by the endpoint device providing the report. The timestamps in the message may include an absolute timestamp for a first entry and time offsets for the other entries, or the time offset from transmission time of the queue to the server (e.g., 8 seconds ago, 547 seconds ago, or 553 seconds ago). For example, the message may include a first report with an absolute timestamp of "03/23/2015 1:02:37 PM," a second report may include a time offset of "15 seconds later" for a report received at "03/23/2015 1:02:52 PM," a third report may include a time offset of "571 seconds later" for a report received at "03/23/2015 1:12:23 PM." Similarly, if there are multiple reports of the same type, for example temperature, the first entry could include the full value, for example 70.5 degrees, which would require 2 bytes, and subsequent reports could include the delta from the previous report, measured in tenths of a degree and that may require 1 byte to represent for example. Alternatively, the "header" could report base values for each report type and each report could include only the delta.

The control panel 20 may identify a source of each report in the message. For example, the control panel may identify a first report was received from Thermostat A, a second report was received from Thermostat A, a third report was received from Thermostat A, a fourth report was received from Thermostat B, etc.

The control panel 20 may identify an event that triggered the report and a specific value for each report. For example, the control panel 20 may transmit a message that indicates a first report was triggered by an event of "Temperature" change where the temperature is sensed at 63 degrees by Thermostat A, a second report was triggered by an event of "Operating state" change where the operating state of the Thermostat A changed from "Idle" to "Heating," a third report was triggered by an event of "Temperature" change where a temperature sensed by Thermostat A is sixty three and a half degrees, and a fourth report was triggered by an event of "Humidity" change where a humidity is sensed at forty percent by Thermostat B.

The monitoring server 30 may receive sensor data from the control panel 20. For example, the monitoring server 30 may receive a message that includes sensor data from a single report or a message that includes queued sensor data from multiple reports. The monitoring server 30 may determine whether a message includes queued sensor data from multiple reports. For example, the monitoring server 30 may determine that the message shown in FIG. 1 includes sensor data from multiple reports. The monitoring server 30 may determine whether a message includes queued sensor data from multiple reports based on one or more of an explicit indication in the message that the message includes sensor data from multiple reports, e.g., a field that has a particular value when a message includes queued sensor data and has another particular value when a message does not include queued sensor data, determining that the message includes time offsets, determining that the message includes multiple triggers for reports, determining that the message indicates multiple sources of sensor data, etc.

Based on a determination that the monitoring server 30 includes sensor data from multiple reports, the monitoring server 30 may dequeue the sensor data from the message. For example, the monitoring server 30 may split the message into individual frames, calculate absolute timestamps for each frame based on time offsets and the absolute timestamp for the first frame, and process each frame as if the monitoring server 30 had received a message with just that frame at the time indicated by the absolute timestamp for the frame. A frame may correspond to a report, as represented by each row in the message shown in FIG. 1.

Figure 2:
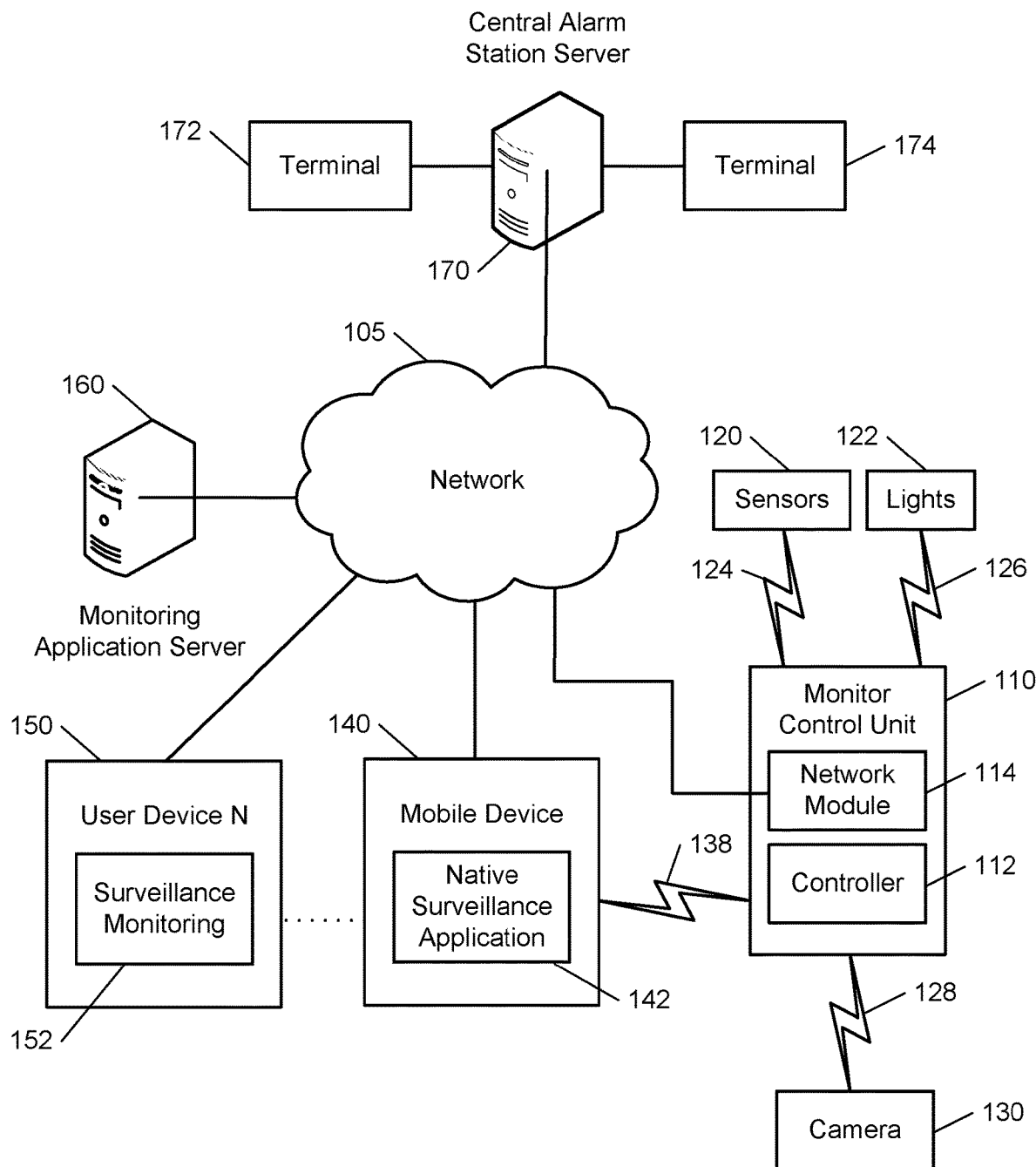
FIG. 2 illustrates an example system for endpoint data collection.

FIG. 2 illustrates an example of a system 200 configured to provide surveillance and reporting. The system 200 includes a network 105, a monitoring system control unit 110, one or more user devices 140, 150, a monitoring application server 160, and a central alarm station server 170. In some examples, the network 105 facilitates communications between the monitoring system control unit 110, the one or more user devices 140, 150, the monitoring application server 160, and the central alarm station server 170.

The network 105 is configured to enable exchange of electronic communications between devices connected to the network 105. For example, the network 105 may be configured to enable exchange of electronic communications between the monitoring system control unit 110, the one or more user devices 140, 150, the monitoring application server 160, and the central alarm station server 170. The network 105 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 105 may include multiple networks or subnetworks, each of which may include, for example, a wired or wireless data pathway. The network 105 may include a circuit-switched network, a packet-switched data network, or any other network able to carry electronic communications (e.g., data or voice communications). For example, the network 105 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 105 may include one or more networks that include wireless data channels and wireless voice channels. The network 105 may be a wireless network, a broadband network, or a combination of networks including a wireless network and a broadband network.

The monitoring system control unit 110 includes a controller 112 and a network module 114. The controller 112 is configured to control a monitoring system (e.g., a home alarm or security system) that includes the monitoring system control unit 110. In some examples, the controller 112 may include a processor or other control circuitry configured to execute instructions of a program that controls operation of an alarm system. In these examples, the controller 112 may be configured to receive input from sensors, detectors, or other devices included in the alarm system and control operations of devices included in the alarm system or other household devices (e.g., a thermostat, an appliance, lights, etc.). For example, the controller 112 may be configured to control operation of the network module 114 included in the monitoring system control unit 110.

The network module 114 is a communication device configured to exchange communications over the network 105. The network module 114 may be a wireless communication module configured to exchange wireless communications over the network 105. For example, the network module 114 may be a wireless communication device configured to exchange communications over a wireless data channel and a wireless voice channel. In this example, the network module 114 may transmit alarm data over a wireless data channel and establish a two-way voice communication session over a wireless voice channel. The wireless communication device may include one or more of a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 114 also may be a wired communication module configured to exchange communications over the network 105 using a wired connection. For instance, the network module 114 may be a modem, a network interface card, or another type of network interface device. The network module 114 may be an Ethernet network card configured to enable the monitoring system control unit 110 to communicate over a local area network and/or the Internet. The network module 114 also may be a voiceband modem configured to enable the alarm panel to communicate over the telephone lines of Plain Old Telephone Systems (POTS).

The monitoring system that includes the monitoring system control unit 110 includes one or more sensors or detectors. For example, the monitoring system may include multiple sensors 120. The sensors 120 may include a contact sensor, a motion sensor, a glass break sensor, or any other type of sensor included in an alarm system or security system. The sensors 120 also may include an environmental sensor, such as a temperature sensor, a water sensor, a rain sensor, a wind sensor, a light sensor, a smoke detector, a carbon monoxide detector, an air quality sensor, etc. The sensors 120 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 120 may include a radio-frequency identification (RFID) sensor that identifies a particular article that includes a pre-assigned RFID tag.

The monitoring system control unit 110 communicates with the module 122 and the camera 130 to perform surveillance or monitoring. The module 122 is connected to one or more lighting systems and is configured to control operation of the one or more lighting systems. The module 122 may control the one or more lighting systems based on commands received from the monitoring system control unit 110. For instance, the module 122 may cause a lighting system to illuminate an area to provide a better image of the area when captured by a camera 130.

The camera 130 may be a video/photographic camera or other type of optical sensing device configured to capture images. For instance, the camera 130 may be configured to capture images of an area within a building monitored by the monitoring system control unit 110. The camera 130 may be configured to capture single, static images of the area and also video images of the area in which multiple images of the area are captured at a relatively high frequency (e.g., thirty images per second). The camera 130 may be controlled based on commands received from the monitoring system control unit 110.

The camera 130 may be triggered by several different types of techniques. For instance, a Passive Infra Red (PIR) motion sensor may be built into the camera 130 and used to trigger the camera 130 to capture one or more images when motion is detected. The camera 130 also may include a microwave motion sensor built into the camera and used to trigger the camera 130 to capture one or more images when motion is detected. The camera 130 may have a "normally open" or "normally closed" digital input that can trigger capture of one or more images when external sensors (e.g., the sensors 120, PIR, door/window, etc.) detect motion or other events. In some implementations, the camera 130 receives a command to capture an image when external devices detect motion or another potential alarm event. The camera 130 may receive the command from the controller 112 or directly from one of the sensors 120.

In some examples, the camera 130 triggers integrated or external illuminators (e.g., Infra Red, Z-wave controlled "white" lights, lights controlled by the module 122, etc.) to improve image quality when the scene is dark. An integrated or separate light sensor may be used to determine if illumination is desired and may result in increased image quality.

The camera 130 may be programmed with any combination of time/day schedules, system "arming state", or other variables to determine whether images should be captured or not when triggers occur. The camera 130 may enter a low-power mode when not capturing images. In this case, the camera 130 may wake periodically to check for inbound messages from the controller 112. The camera 130 may be powered by internal, replaceable batteries if located remotely from the monitoring system control unit 110. The camera 130 may employ a small solar cell to recharge the battery when light is available. Alternatively, the camera 130 may be powered by the controller's 112 power supply if the camera 130 is co-located with the controller 112.

The sensors 120, the module 122, and the camera 130 communicate with the controller 112 over communication links 124, 126, and 128. The communication links 124, 126, and 128 may be a wired or wireless data pathway configured to transmit signals from the sensors 120, the module 122, and the camera 130 to the controller 112. The sensors 120, the module 122, and the camera 130 may continuously transmit sensed values to the controller 112, periodically transmit sensed values to the controller 112, or transmit sensed values to the controller 112 in response to a change in a sensed value.

The communication link 128 over which the camera 130 and the controller 112 communicate may include a local network. The camera 130 and the controller 112 may exchange images and commands over the local network. The local network may include 802.11 "WiFi" wireless Ethernet (e.g., using low-power WiFi chipsets), Z-Wave, Zigbee, Bluetooth, "Homeplug" or other "Powerline" networks that operate over AC wiring, and a Category 5 (CAT5) or Category 6 (CAT6) wired Ethernet network.

The monitoring application server 160 is an electronic device configured to provide monitoring services by exchanging electronic communications with the monitoring system control unit 110, the one or more user devices 140, 150, and the central alarm station server 170 over the network 105. For example, the monitoring application server 160 may be configured to monitor events (e.g., alarm events) generated by the monitoring system control unit 110. In this example, the monitoring application server 160 may exchange electronic communications with the network module 114 included in the monitoring system control unit 110 to receive information regarding events (e.g., alarm events) detected by the monitoring system control unit 110. The monitoring application server 160 also may receive information regarding events (e.g., alarm events) from the one or more user devices 140, 150.

In some examples, the monitoring application server 160 may route alarm data received from the network module 114 or the one or more user devices 140, 150 to the central alarm station server 170. For example, the monitoring application server 160 may transmit the alarm data to the central alarm station server 170 over the network 105.

The monitoring application server 160 may store sensor and image data received from the monitoring system and perform analysis of sensor and image data received from the monitoring system. Based on the analysis, the monitoring application server 160 may communicate with and control aspects of the monitoring system control unit 110 or the one or more user devices 140, 150.

The central alarm station server 170 is an electronic device configured to provide alarm monitoring service by exchanging communications with the monitoring system control unit 110, the one or more user devices 140, 150, and the monitoring application server 160 over the network 105. For example, the central alarm station server 170 may be configured to monitor alarm events generated by the monitoring system control unit 110. In this example, the central alarm station server 170 may exchange communications with the network module 114 included in the monitoring system control unit 110 to receive information regarding alarm events detected by the monitoring system control unit 110. The central alarm station server 170 also may receive information regarding alarm events from the one or more user devices 140, 150.

The central alarm station server 170 is connected to multiple terminals 172 and 174. The terminals 172 and 174 may be used by operators to process alarm events. For example, the central alarm station server 170 may route alarm data to the terminals 172 and 174 to enable an operator to process the alarm data. The terminals 172 and 174 may include general-purpose computers (e.g., desktop personal computers, workstations, or laptop computers) that are configured to receive alarm data from a server in the central alarm station server 170 and render a display of information based on the alarm data. For instance, the controller 112 may control the network module 114 to transmit, to the central alarm station server 170, alarm data indicating that a sensor 120 detected a door opening when the monitoring system was armed. The central alarm station server 170 may receive the alarm data and route the alarm data to the terminal 172 for processing by an operator associated with the terminal 172. The terminal 172 may render a display to the operator that includes information associated with the alarm event (e.g., the name of the user of the alarm system, the address of the building the alarm system is monitoring, the type of alarm event, etc.) and the operator may handle the alarm event based on the displayed information.

In some implementations, the terminals 172 and 174 may be mobile devices or devices designed for a specific function. Although FIG. 2 illustrates two terminals for brevity, actual implementations may include more (and, perhaps, many more) terminals.

The one or more user devices 140, 150 are devices that host and display user interfaces. For instance, the user device 140 is a mobile device that hosts one or more native applications (e.g., the native surveillance application 142). The user device 140 may be a cellular phone or a non-cellular locally networked device with a display. The user device 140 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 140 may perform functions unrelated to the monitoring system, such as placing personal telephone calls, playing music, playing video, displaying pictures, browsing the Internet, maintaining an electronic calendar, etc.

The user device 140 includes a native surveillance application 142. The native surveillance application 142 refers to a software/firmware program running on the corresponding mobile device that enables the user interface and features described throughout. The user device 140 may load or install the native surveillance application 142 based on data received over a network or data received from local media. The native surveillance application 142 runs on mobile devices platforms, such as iPhone, iPod touch, Blackberry, Google Android, Windows Mobile, etc. The native surveillance application 142 enables the user device 140 to receive and process image and sensor data from the monitoring system.

The user device 150 may be a general-purpose computer (e.g., a desktop personal computer, a workstation, or a laptop computer) that is configured to communicate with the monitoring application server 160 and/or the monitoring system control unit 110 over the network 105. The user device 150 may be configured to display a surveillance monitoring user interface 152 that is generated by the user device 150 or generated by the monitoring application server 160. For example, the user device 150 may be configured to display a user interface (e.g., a web page) provided by the monitoring application server 160 that enables a user to perceive images captured by the camera 130 and/or reports related to the monitoring system. Although FIG. 2 illustrates two user devices for brevity, actual implementations may include more (and, perhaps, many more) or fewer user devices.

In some implementations, the one or more user devices 140, 150 communicate with and receive monitoring system data from the monitoring system control unit 110 using the communication link 138. For instance, the one or more user devices 140, 150 may communicate with the monitoring system control unit 110 using various local wireless protocols such as wifi, Bluetooth, Z-wave, Zigbee, HomePlug (ethernet over powerline), or wired protocols such as Ethernet and USB, to connect the one or more user devices 140, 150 to local security and automation equipment. The one or more user devices 140, 150 may connect locally to the monitoring system and its sensors and other devices. The local connection may improve the speed of status and control communications because communicating through the network 105 with a remote server (e.g., the monitoring application server 160) may be significantly slower.

Although the one or more user devices 140, 150 are shown as communicating with the monitoring system control unit 110, the one or more user devices 140, 150 may communicate directly with the sensors and other devices controlled by the monitoring system control unit 110. In some implementations, the one or more user devices 140, 150 replace the monitoring system control unit 110 and perform the functions of the monitoring system control unit 110 for local monitoring and long range/offsite communication.

In other implementations, the one or more user devices 140, 150 receive monitoring system data captured by the monitoring system control unit 110 through the network 105. The one or more user devices 140, 150 may receive the data from the monitoring system control unit 110 through the network 105 or the monitoring application server 160 may relay data received from the monitoring system control unit 110 to the one or more user devices 140, 150 through the network 105. In this regard, the monitoring application server 160 may facilitate communication between the one or more user devices 140, 150 and the monitoring system.

In some implementations, the one or more user devices 140, 150 may be configured to switch whether the one or more user devices 140, 150 communicate with the monitoring system control unit 110 directly (e.g., through link 138) or through the monitoring application server 160 (e.g., through network 105) based on a location of the one or more user devices 140, 150. For instance, when the one or more user devices 140, 150 are located close to the monitoring system control unit 110 and in range to communicate directly with the monitoring system control unit 110, the one or more user devices 140, 150 use direct communication. When the one or more user devices 140, 150 are located far from the monitoring system control unit 110 and not in range to communicate directly with the monitoring system control unit 110, the one or more user devices 140, 150 use communication through the monitoring application server 160.

Although the one or more user devices 140, 150 are shown as being connected to the network 105, in some implementations, the one or more user devices 140, 150 are not connected to the network 105. In these implementations, the one or more user devices 140, 150 communicate directly with one or more of the monitoring system components and no network (e.g., Internet) connection or reliance on remote servers is needed.

In some implementations, the one or more user devices 140, 150 are used in conjunction with only local sensors and/or local devices in a house. In these implementations, the system 200 only includes the one or more user devices 140, 150, the sensors 120, the module 122, and the camera 130. The one or more user devices 140, 150 receive data directly from the sensors 120, the module 122, and the camera 130 and sends data directly to the sensors 120, the module 122, and the camera 130. The one or more user devices 140, 150 provide the appropriate interfaces/processing to provide visual surveillance and reporting.

In other implementations, the system 200 further includes network 105 and the sensors 120, the module 122, and the camera 130 are configured to communicate sensor and image data to the one or more user devices 140, 150 over network 105 (e.g., the Internet, cellular network, etc.). In yet another implementation, the sensors 120, the module 122, and the camera 130 (or a component, such as a bridge/router) are intelligent enough to change the communication pathway from a direct local pathway when the one or more user devices 140, 150 are in close physical proximity to the sensors 120, the module 122, and the camera 130 to a pathway over network 105 when the one or more user devices 140, 150 are farther from the sensors 120, the module 122, and the camera 130. In some examples, the system leverages GPS information from the one or more user devices 140, 150 to determine whether the one or more user devices 140, 150 are close enough to the sensors 120, the module 122, and the camera 130 to use the direct local pathway or whether the one or more user devices 140, 150 are far enough from the sensors 120, the module 122, and the camera 130 that the pathway over network 105 is required. In other examples, the system leverages status communications (e.g., pinging) between the one or more user devices 140, 150 and the sensors 120, the module 122, and the camera 130 to determine whether communication using the direct local pathway is possible. If communication using the direct local pathway is possible, the one or more user devices 140, 150 communicate with the sensors 120, the module 122, and the camera 130 using the direct local pathway. If communication using the direct local pathway is not possible, the one or more user devices 140, 150 communicate with the sensors 120, the module 122, and the camera 130 using the pathway over network 105.

In some implementations, the system 200 provides end users with access to images captured by the camera 130 to aid in decision making. The system 200 may transmit the images captured by the camera 130 over a wireless WAN network to the user devices 140, 150. Because transmission over a wireless WAN network may be relatively expensive, the system 200 uses several techniques to reduce costs while providing access to significant levels of useful visual information.

In some implementations, a state of the monitoring system and other events sensed by the monitoring system may be used to enable/disable video/image recording devices (e.g., the camera 130). In these implementations, the camera 130 may be set to capture images on a periodic basis when the alarm system is armed in an "Away" state, but set not to capture images when the alarm system is armed in a "Stay" state or disarmed. In addition, the camera 130 may be triggered to begin capturing images when the alarm system detects an event, such as an alarm event, a door opening event for a door that leads to an area within a field of view of the camera 130, or motion in the area within the field of view of the camera 130. In other implementations, the camera 130 may capture images continuously, but the captured images may be stored or transmitted over a network when needed.

In some implementations, the sensors 120 may be configured to push reports to the monitor control unit 110, which may include the control panel 20. The monitor control unit 110 may be configured to queue the reports and at an appropriate time, send a message to the monitoring application server 160 including sensor data as indicated by the reports queued by the monitor control unit 110. For example, as described above, the monitor control unit 110 may send a message once a predetermined number of reports have been queued, a predetermined size of a queue exceeds a buffer, a predetermined length of time has passed since the last message was sent, a request from the monitoring server 30 was received, or some other reporting criteria is satisfied. The monitoring application server 160 may process the message as individual messages.

Figure 3:
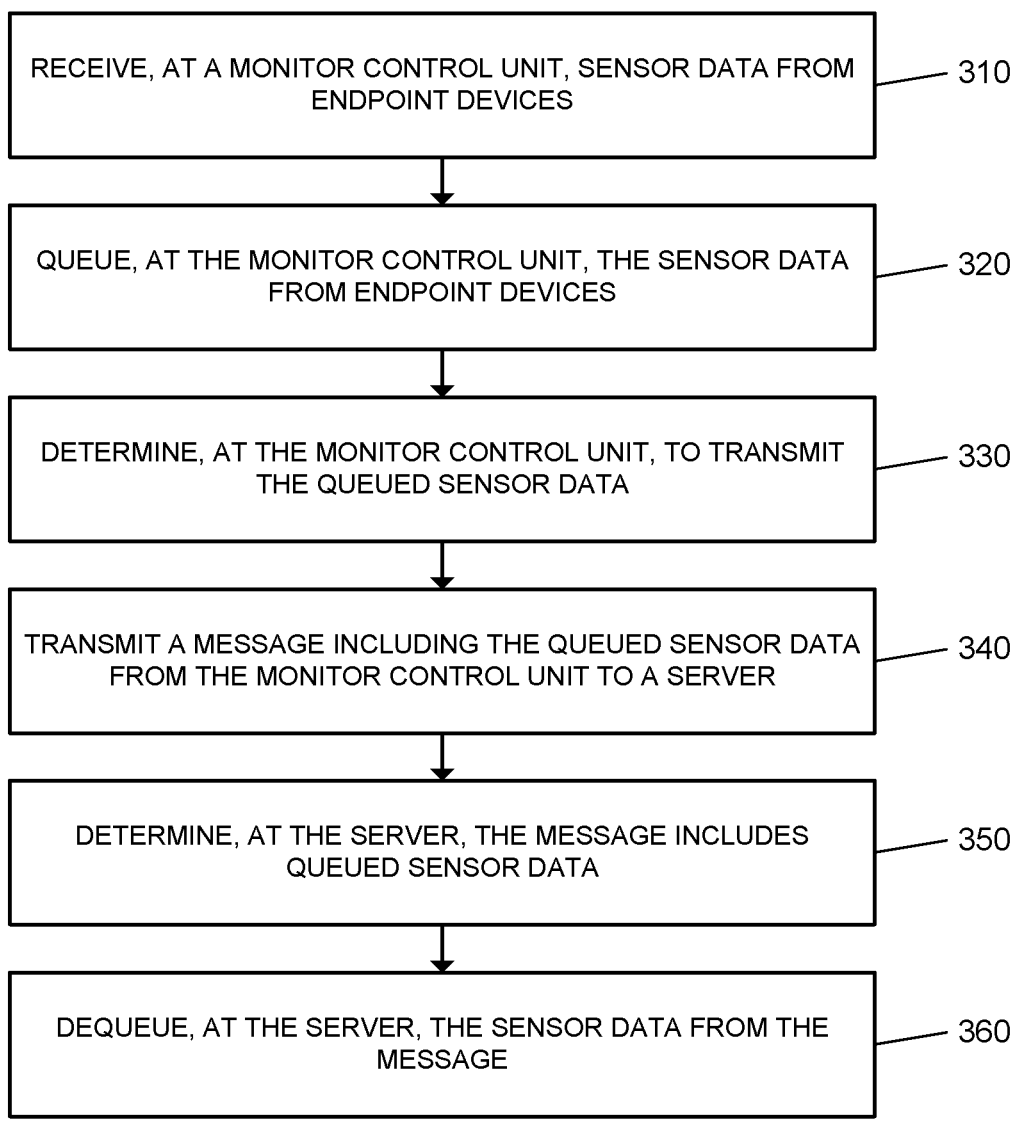
FIGS. 3 and 4 are flow charts of example processes for endpoint data collection.

FIG. 3 illustrates an example process 300 for collecting data. The system 200 collects, at a monitor control unit 110, sensor data from endpoint devices (310). For example, the monitor control unit 110 may receive multiple reports including sensor data pushed from sensors 120. The system 200 queues, at the control panel, the sensor data from the endpoint devices (320). For example, the monitor control unit 110 may add the sensor data from the reports to a queue that indicates a timestamp, endpoint device source, trigger event, and value for each report. The system 200 determines, at the monitor control unit 110, to transmit the queued sensor data to the monitoring server 30 (330). For example, the monitor control unit 110 may determine that a threshold amount of data for the queue has been reached, and in response, determine to transmit a message including the data for the queue to the monitoring application server 160. Alternatively, the server 160, or the user devices 150 and/or 140, may request that the monitor control unit 110 flush all queued message, for example, when the user logs into a mobile application. The system 200 transmits a message including the queued sensor data from the monitor control unit 110 to the monitoring application server 160 (340). For example, the monitor control unit 110 may transmit a message including information for all the queued reports to the monitoring application server 160. The system 200 determines, at the server, the message includes queued sensor data (350). For example, the monitoring application server 160 may determine that the message includes a field that is set to a predetermined value that indicates that the message includes queued sensor data. The system 200 dequeues, at the server 160, the sensor data from the message (360). For example, the server 160 may split a message into individual frames that each correspond to a report, calculate an absolute timestamp for each frame besides the first frame based on an absolute timestamp of the first frame and time offsets of other frames, and process each frame as a message.

Figure 4:
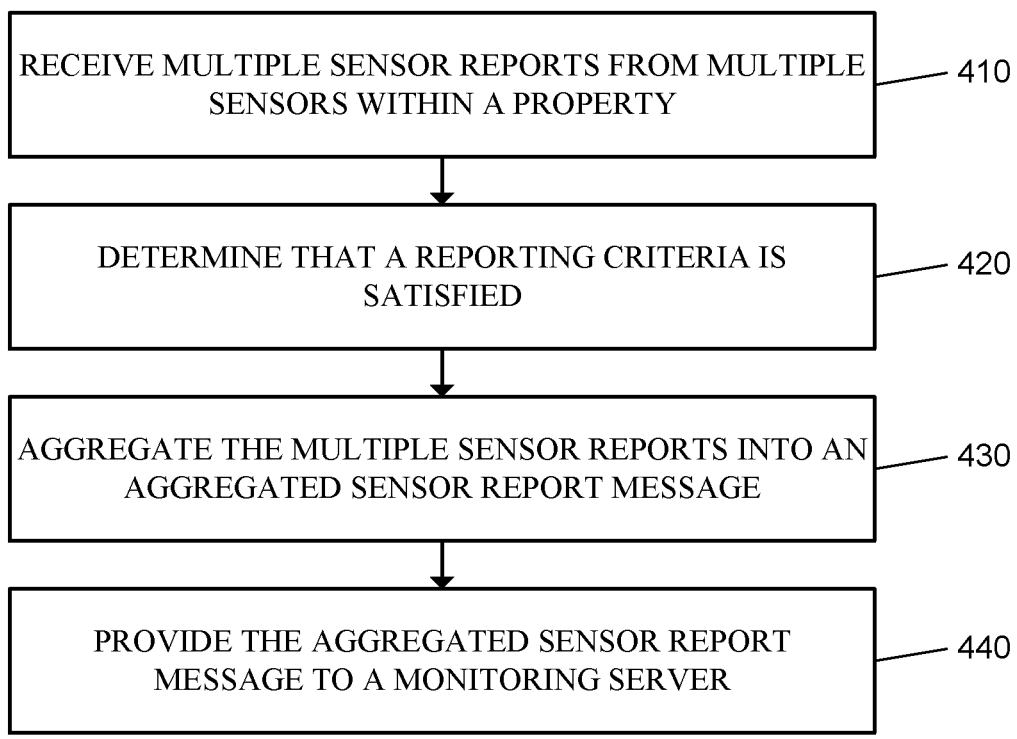

FIG. 4 illustrates an example process 400 for providing an aggregated sensor report message to a monitoring server. The following describes the process 400 as being performed by components of the system 200 that are described with reference to FIG. 2. However, the process 200 may be performed by other systems or system configurations.

The system receives multiple sensor reports from sensors within a property (410). The property may be monitored by an in-home monitoring system, for example an in-home security system, and may be equipped with multiple sensors throughout the property. The sensors may include one or more of contact sensors associated with doors or windows of the property, motion detector sensors, a door bell sensor, smart appliances, thermostats, temperature sensors, humidity sensors, light intensity sensors, water sensors, carbon monoxide detection sensors, air quality sensors, or a HVAC system that senses humidity and temperature within the property. Each of the received sensor reports may describe one or more of a detected event, an identifier for the sensor that detected the event, and a value for the detected event. For example, a sensor report may describe sensor data received from a contact sensor at the front door of the property that indicates that the front door opened and that the contact sensor detected the front door opening. In another example, a sensor report from a thermostat may describe that a change in operating state occurred, that the operating state is now heating, and that the Thermostat A is reporting the change in operating state.

The monitor control unit 110 may receive the multiple sensor reports from each of the multiple sensors over a network. The monitor control unit 110 may receive sensor report data from a sensor when there is a change in a sensed value. For example, a temperature sensor may communicate a sensor report to the monitor control unit in response to sensing a three degree temperature change at the property. The monitor control unit 110 may be configured to receive multiple sensor reports and queue the reports for sending to the monitoring application server 160 in intervals. The system is configured to communicate the sensor reports in intervals to reduce bandwidth used by the system or to conserve power used by the system. In some implementations, the system may reduce bandwidth used by up to five times or conserve five times as much power by providing the reports to the monitoring application server in intervals. For example, sending each individual sensor report to the monitoring application server may result in transmissions that include a low ratio of sensor data to transmission size as each report may need to include a header for routing purposes, and sending an aggregated sensor report may include a high ratio of sensor data to transmission size as a header may be sent only a single time to report all the aggregated sensor data.

The system determines that a reporting criteria is satisfied (420). The system may be configured to include multiple different reporting criteria. Each of the multiple different reporting criteria are conditions that, when satisfied, trigger the communication of sensor report data from the control unit 110 to the monitoring application server 160. A reporting criteria may be satisfied when the monitor control unit 110 receives a predetermined number of sensor reports. In some implementations, the control unit 110 may determine a reporting criteria is satisfied when the control unit receives a predetermined number of sensor reports from a particular sensor. For example, the reporting criteria may be determined to be satisfied when the control unit receives ten sensor reports from a doorbell sensor. In other implementations, the control unit 110 may determine a reporting criteria is satisfied when the control unit receives a predetermined number of sensor reports from multiple sensors. For example, the reporting criteria may be determined to be satisfied when the control unit receives a total of twelve sensor reports from any sensor including, for example, the doorbell sensor, the contact sensor at the front door, and the thermostat.

The control unit 110 may determine a reporting criteria is satisfied when a request for data is received from the monitoring application server 160. In some implementations, a user associated with the monitored property may wish to receive data from the in-home monitoring system. For example, the user may open the surveillance application 142 on a mobile computing device or the user may log into a property monitoring website. The user may further request data that indicates the sensed conditions from one or more sensors within the monitored property. The user may request to receive sensor reports from a particular sensor. For example, the user may request to receive sensor reports from the contact sensor at the front door of the monitored property. The user's request may be communicated over the network 105 to the monitoring application server 160.

When the monitoring application server 160 receives the user's request for data, e.g., an indication that the surveillance application 142 was opened, an indication that a property monitoring website was accessed, or an indication that information for a particular sensor is desired, the monitoring server communicates the request for data to the control unit 110. In some implementations, the control unit 110 may communicate data for all sensor reports in queue at the control unit at the time of the request for data was received. For example, the user may log into a property monitoring website provided by the monitoring application server 160, in response, the monitoring application server 160 may provide a request to the control unit 110 for all queued data, and the control unit 110 may communicate an aggregated sensor report that includes data from all sensor reports. In some implementations, the control unit 110 may communicate only data that satisfies the user's request to the monitoring application server 160. For example, the user may request the last five front door opening events and associated opening times, and the control unit may communicate this data to the monitoring server. In other implementations, the control unit may communicate the requested data along with any other sensor reports in queue at the control unit at the time of the request for data was received. For example, the user may request data associated with a particular motion sensor, and the control unit may communicate the requested information along with the other sensor reports in queue at the control unit since the last message was sent to the monitoring application server 160.

The control unit 110 may determine a reporting criteria is satisfied when a high priority event is detected. For example, the control unit 110 may determine to push data to the monitoring application server 160 when an alarm event is detected within the property. The control unit may be configured to respond to one or more high priority events. In some implementations, the user may designate which events should be treated as a high priority event. The user may designate the one or more high priority events using the surveillance application 142 on the user's mobile device 140. For example, the user may designate the opening of the window in a child's room to be a high priority event. In another example, the user may designate a change in temperature within the property as a high priority event. The control unit 110 may communicate the sensor report associated with the detected high priority event, along with any other sensor report data in queue, to the monitoring application server 160.

The monitoring application server 160 may communicate a notification to the user's mobile device 140 that indicates that a high priority event was detected. In some examples, the notification may include the time of the event, the sensor that triggered the event, and the sensed condition. For example, the monitoring server may send a notification to the user indicating that the back door was opened at 3:40 AM. In some implementations, the control unit 110 may communicate the received high priority event data in a single message to the monitoring application server. For example, the control unit may receive a report from a thermostat indicting the temperate in the property dropped below fifty degrees, and may communicate the received sensor data to the monitoring application server 160. The control unit 110 may determine a reporting criteria is satisfied when a predetermined period of time has elapsed since the last sensor report was received. For example, the control unit 110 may determine a reporting criteria is satisfied when thirty minutes have elapsed since a sensor report was last received at the control unit. The control unit 110 may determine a reporting criteria is satisfied when a predetermined period of time has elapsed since an aggregated sensor report has been transmitted to the monitoring application server 160. For example, the control unit 110 may determine a reporting criteria is satisfied when an hour has elapsed since the last report was transmitted. The control unit 110 may determine a reporting criteria is satisfied when a predetermined size of sensor reports that exceeds a buffer size is received. The control unit 100 may be in communication with a buffer that temporarily stores the sensor reports received from the multiple sensors. In some implementations, the reporting criteria may be satisfied when the buffer cannot storage any additional data. In more detail, the control unit 110 may determine that a reporting criteria is satisfied when the control unit receives a sensor report that exceeds the available storage in the buffer. For example, the control unit 110 may determine the reporting criteria is satisfied when it receives a 256 KB sized sensor report and the buffer has only 128 KB of available storage space.

The system aggregates the multiple sensor reports into an aggregated sensor report message (430). The control unit 110 may aggregate sensor report data as the data is received from one or more sensors. In some examples, the control unit 110 may only aggregate the received sensor data in response to determining that a reporting criteria is satisfied. In some implementations, the control unit 110 may group sensor reports associated with a particular sensor into an aggregated sensor report message. For example, the aggregated sensor report message may include grouped sensor reports for sensor A, grouped sensor reports for sensor B, grouped reports for sensor C, and grouped reports for sensor D, etc., included in a single aggregated sensor report message. Accordingly, instead of labeling sensor data for each report with an identifier for the sensor, a group of sensor reports may be identified for the sensor. For example, for twenty sensor reports from sensor A may include twenty identifiers for sensor A, one for each report, the twenty sensor reports may be grouped together and the entire group may be associated with a single identifier for sensor A. Thus, the grouping may reduce the size of the aggregated sensor report message. In some implementations, the control unit 110 may identify patterns in the received sensor data, and may use a variety of different data compression techniques to compress the data. For example, the control unit 110 may use FFT to compress temperature data received from the one or more temperature sensors at the monitored property. The control unit 110 may reduce the size of the aggregated sensor report by including compressed sensor data for patterned sensor data.

In some implementations, the control unit 110 may use shortened sensor identifiers within an aggregated sensor report message. Each sensor within the monitored property may be associated with a unique identifier, and the control unit 110 may determine a shortened identifier indicative for the unique identifier. For example, sensor A may have a four byte unique identifier of "3A2E" within a system and the shortened identifier for "3A2E" in an aggregated sensor report message may be a one byte identifier of "2" that is unique within the message. The control unit 110 may use the shortened identifier to identify a particular sensor in an aggregated sensor report message and include an indication in the message that the shortened identifier is for the unique identifier. Thus, the grouping may reduce the size of the aggregated sensor report message.

In some implementations, the control unit 110 may group the sensor reports based on the associated identifier. The control unit 110 may generate a shortened unique identifier for the grouped sensor reports, and associate the grouped reports with the generated shortened identifier. For example, the control unit 110 may receive several sensor reports from the same temperature sensor, and may aggregate the received sensor reports into a single message, and append the single message with a shortened identifier that indicates unique identifier for the particular temperature sensor.

The grouped sensor reports may include the timestamps for each of the sensed events included in the report. For example, the timestamps may indicate the time the sensor report was received by the control unit, or the timestamp may indicate when the report was generated by the sensor. The timestamps may include an absolute timestamp for a first entry and time offsets for the other entries, or the time offset from transmission time of the queue to the server (e.g., 60 seconds ago, 47 seconds ago, or 205 seconds ago). For example, the message may include a first report with an absolute timestamp of "05/05/2016 3:02:41 PM," a second report may include a time offset of "15 seconds later" for a report received at "05/05/2016 3:02:56 PM." Using time offsets may result in less use of bandwidth as absolute timestamps may require a larger amount of data for representation than time offsets require for representation. Similarly, if there are multiple reports of the same type, for example temperature, the first entry could include the full value, for example 70.5 degrees, which would require 2 bytes, and subsequent reports could include the delta from the previous report, measured in tenths of a degree for example. Alternatively, the "header" could report base values for each report type and each report could include only the delta.

In some implementations, the aggregated sensor report may include a source of each report, the event that triggered the report, and the sensed value. For example, the control unit 110 may identify a first report was received from Thermostat A, a second report was received from Thermostat A, a third report was received from Thermostat A, a fourth report was received from Thermostat B, etc. The control unit 110 may identify an event that triggered the report and a specific value for each report. For example, the control unit 110 may transmit a message that indicates a first report was triggered by an event of "Temperature" change where the temperature is sensed at 63 degrees by Thermostat A, a second report was triggered by an event of "Operating state" change where the operating state of the Thermostat A changed from "Idle" to "Heating," a third report was triggered by an event of "Temperature" change where a temperature sensed by Thermostat A is sixty three and a half degrees, and a fourth report was triggered by an event of "Humidity" change where a humidity is sensed at forty percent by Thermostat B.

The system provides the aggregated sensor report message to a monitoring server (440). The control unit 110 may communicate the generated aggregated sensor report message to the monitoring application server 160 over the network 105. The control unit 110 may reduce an amount of bandwidth used for providing sensor data to the monitoring application server 160 based on including sensor data from multiple reports in a single aggregated message instead of sending a separate message for each report received. In some implementations, the message may be communicated as a single data packet with a single header and a payload. In some examples where the aggregated reports represent the sensor data received from a particular sensor, the shortened identifier may be the header of the data packet, and the payload of the data packet may include the aggregated sensor data with the timestamp of the sensed events.

Other arrangements and distribution of processing is possible and contemplated within the present disclosure.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

The invention claimed is:

1. A computer-implemented method comprising:
receiving, by a monitoring system that is configured to monitor a property, multiple sensor reports from sensors at the property, wherein each sensor report describes sensor data generated by a respective sensor monitoring the property;
analyzing, by the monitoring system, the multiple sensor reports from the sensors at the property;

aggregating, by the monitoring system, the multiple sensor reports into an aggregated sensor report message, wherein aggregating comprises;
  identifying, by the monitoring system, patterns in the multiple sensor reports from the sensors at the property; and
  compressing, by the monitoring system, using one or more data compression techniques the multiple sensor reports into a report message; and
in response to determining that a reporting criteria has been satisfied, communicating the aggregated sensor report message to a monitoring server.

2. The computer-implemented method of claim 1, wherein aggregating, by the monitoring system, the multiple sensor reports into an aggregated sensor report message comprises:
  including a timestamp for a first entry; and
  including a time offset from the timestamp for each other entry included in the aggregated sensor report message.

3. The computer-implemented method of claim 1, wherein aggregating, by the monitoring system, the multiple sensor reports into an aggregated sensor report message comprises:
  grouping the sensor reports from a particular sensor; and
  including a single identifier for the group to indicate the sensor reports in the group are from the particular sensor.

4. The computer-implemented method of claim 1, wherein aggregating, by the monitoring system, the multiple sensor reports into an aggregated sensor report message comprises:
  labeling the sensor reports with a shortened unique identifier for the particular sensor; and
  including an indication that the shortened unique identifier corresponds to a complete unique identifier for the particular sensor.

5. The computer-implemented method of claim 1, wherein aggregating, by the monitoring system, the multiple sensor reports into an aggregated sensor report message comprises:
  including a base value for temperature; and
  including a delta from the base value for entry for temperature included in the aggregated sensor report message.

6. The computer-implemented method of claim 1, wherein aggregating, by the monitoring system, the multiple sensor reports into an aggregated sensor report message comprises:
  including an initial temperature value for a first entry; and
  including a delta from the initial temperature value for the other entries for temperature.

7. The computer-implemented method of claim 1, wherein in response to determining that a reporting criteria has been satisfied, communicating the aggregated sensor report message to a monitoring server comprises:
  comparing a number of sensor reports to a sensor report threshold;
  determining that the number of sensor reports exceeds the sensor report threshold; and
  based on determining that the number of sensor reports exceeds the sensor report threshold, communicating the aggregated sensor report message to the monitoring server.

8. The computer-implemented method of claim 1, wherein in response to determining that a reporting criteria has been satisfied, communicating the aggregated sensor report message to a monitoring server comprises:
  determining that a predetermined period of time has elapsed from the time of communicating a prior aggregated sensor report message to the monitoring server; and
  based on determining that a predetermined period of time has elapsed from the time of communicating the prior aggregated sensor report message to the monitoring server, communicating the aggregated sensor report message to the monitoring server.

9. The computer-implemented method of claim 1, wherein in response to determining that a reporting criteria has been satisfied, communicating the aggregated sensor report message to a monitoring server comprises:
  comparing a size of the aggregated sensor report to a buffer size threshold;
  determining that the size of the aggregated sensor report exceeds the buffer size threshold; and
  based on determining that the size of the aggregated sensor report exceeds the buffer size threshold, communicating the aggregated sensor report message to the monitoring server.

10. A system comprising:
one or more computers; and
memory storing instructions that, upon being executed by the one or more computers, cause the one or more computers to perform operations comprising:
  receiving, by a monitoring system that is configured to monitor a property, multiple sensor reports from sensors at the property, wherein each sensor report describes sensor data generated by a respective sensor monitoring the property;
  analyzing, by the monitoring system, the multiple sensor reports from the sensors at the property;
  aggregating, by the monitoring system, the multiple sensor reports into an aggregated sensor report message, wherein aggregating comprises;
    identifying, by the monitoring system, patterns in the multiple sensor reports from the sensors at the property; and
    compressing, by the monitoring system, using one or more data compression techniques the multiple sensor reports into a report message; and
  in response to determining that a reporting criteria has been satisfied, communicating the aggregated sensor report message to a monitoring server.

11. The system of claim 10, wherein aggregating, by the monitoring system, the multiple sensor reports into an aggregated sensor report message comprises:
  including a timestamp for a first entry; and
  including a time offset from the timestamp for each other entry included in the aggregated sensor report message.

12. The system of claim 10, wherein aggregating, by the monitoring system, the multiple sensor reports into an aggregated sensor report message comprises:
  grouping the sensor reports from a particular sensor; and
  including a single identifier for the group to indicate the sensor reports in the group are from the particular sensor.

13. The system of claim 10, wherein aggregating, by the monitoring system, the multiple sensor reports into an aggregated sensor report message comprises:
  labeling the sensor reports with a shortened unique identifier for the particular sensor; and
  including an indication that the shortened unique identifier corresponds to a complete unique identifier for the particular sensor.

14. The system of claim 10, wherein aggregating, by the monitoring system, the multiple sensor reports into an aggregated sensor report message comprises:
including a base value for temperature; and
including a delta from the base value for entry for temperature included in the aggregated sensor report message.

15. The system of claim 10, wherein aggregating, by the monitoring system, the multiple sensor reports into an aggregated sensor report message comprises:
including an initial temperature value for a first entry; and
including a delta from the initial temperature value for the other entries for temperature.

16. The system of claim 10, wherein in response to determining that a reporting criteria has been satisfied, communicating the aggregated sensor report message to a monitoring server comprises:
comparing a number of sensor reports to a sensor report threshold;
determining that the number of sensor reports exceeds the sensor report threshold; and
based on determining that the number of sensor reports exceeds the sensor report threshold, communicating the aggregated sensor report message to the monitoring server.

17. The system of claim 10, wherein in response to determining that a reporting criteria has been satisfied, communicating the aggregated sensor report message to a monitoring server comprises:
determining that a predetermined period of time has elapsed from the time of communicating a prior aggregated sensor report message to the monitoring server; and
based on determining that a predetermined period of time has elapsed from the time of communicating the prior aggregated sensor report message to the monitoring server, communicating the aggregated sensor report message to the monitoring server.

18. The system of claim 10, wherein in response to determining that a reporting criteria has been satisfied, communicating the aggregated sensor report message to a monitoring server comprises:
comparing a size of the aggregated sensor report to a buffer size threshold;
determining that the size of the aggregated sensor report exceeds the buffer size threshold; and
based on determining that the size of the aggregated sensor report exceeds the buffer size threshold, communicating the aggregated sensor report message to the monitoring server.

19. A computer-readable storage device storing instructions that, upon execution by one or more processors, cause the one or more processors to perform operations comprising:
receiving, by a monitoring system that is configured to monitor a property, multiple sensor reports from sensors at the property, wherein each sensor report describes sensor data generated by a respective sensor monitoring the property;
analyzing, by the monitoring system, the multiple sensor reports from the sensors at the property;
aggregating, by the monitoring system, the multiple sensor reports into an aggregated sensor report message, wherein aggregating comprises;
identifying, by the monitoring system, patterns in the multiple sensor reports from the sensors at the property; and
compressing, by the monitoring system, using one or more data compression techniques the multiple sensor reports into a report message; and
in response to determining that a reporting criteria has been satisfied, communicating the aggregated sensor report message to a monitoring server.

20. The device of claim 19, wherein aggregating, by the monitoring system, the multiple sensor reports into an aggregated sensor report message comprises:
including a timestamp for a first entry; and
including a time offset from the timestamp for each other entry included in the aggregated sensor report message.

* * * * *